(12) United States Patent
Shin et al.

(10) Patent No.: US 9,206,294 B2
(45) Date of Patent: Dec. 8, 2015

(54) ACRYLIC RESIN FILM HAVING GOOD TRANSPARENCY AND IMPACT RESISTANCE AND METHOD FOR MANUFACTURING SAME

(71) Applicant: LG Hausys, Ltd., Seoul (KR)

(72) Inventors: Chang Hak Shin, Seoul (KR); Eung Kee Lee, Anyang-si (KR); Ku Il Park, Yongin-si (KR); Deok Ryul Hwang, Seoul (KR); Min Hee Lee, Gunpo-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/356,994

(22) PCT Filed: Nov. 20, 2012

(86) PCT No.: PCT/KR2012/009832
§ 371 (c)(1),
(2) Date: May 8, 2014

(87) PCT Pub. No.: WO2013/077612
PCT Pub. Date: May 30, 2013

(65) Prior Publication Data
US 2014/0309374 A1 Oct. 16, 2014

(30) Foreign Application Priority Data
Nov. 23, 2011 (KR) ......................... 10-2011-0122750

(51) Int. Cl.
*C08J 5/18* (2006.01)
*C08L 51/04* (2006.01)
*C08L 33/08* (2006.01)
*C08L 33/12* (2006.01)
*C08L 25/06* (2006.01)
*B29D 7/01* (2006.01)
*C08L 33/14* (2006.01)
*B29K 33/00* (2006.01)

(52) U.S. Cl.
CPC ... *C08J 5/18* (2013.01); *B29D 7/01* (2013.01); *C08L 33/12* (2013.01); *C08L 33/14* (2013.01); *B29K 2033/08* (2013.01); *C08J 2333/12* (2013.01); *C08J 2425/06* (2013.01); *C08J 2433/08* (2013.01); *C08L 2203/16* (2013.01)

(58) Field of Classification Search
None
See application file for complete search history.

(56) References Cited

U.S. PATENT DOCUMENTS

| | | | | |
|---|---|---|---|---|
| 2004/0043235 A1* | 3/2004 | Sugaya et al. | | 428/500 |
| 2004/0263966 A1* | 12/2004 | Momose et al. | | 359/453 |
| 2010/0136354 A1* | 6/2010 | Taniguchi et al. | | 428/500 |
| 2011/0160383 A1* | 6/2011 | Kwon et al. | | 524/523 |
| 2013/0184375 A1* | 7/2013 | Aoyama et al. | | 523/220 |

FOREIGN PATENT DOCUMENTS

| | | |
|---|---|---|
| CN | 1450117 A | 10/2003 |
| CN | 102115568 A | 7/2011 |
| JP | 2001062894 A | 3/2001 |
| JP | 4553729 B2 | 9/2010 |
| KR | 1019990058668 A | 7/1999 |
| KR | 100274658 B1 | 12/2000 |
| KR | 100725940 B1 | 6/2007 |
| KR | 20080005579 A | 1/2008 |
| KR | 20110035018 A | 4/2011 |
| KR | 20110079487 A | 7/2011 |

OTHER PUBLICATIONS

International Search Report for PCT/KR2012/009832 mailed on Mar. 28, 2013.

* cited by examiner

*Primary Examiner* — Jeffrey Mullis
(74) *Attorney, Agent, or Firm* — Hauptman Ham, LLP

(57) ABSTRACT

Disclosed are an acrylic resin film maintaining a gloss and having good transparency, processing properties, and impact resistance after thermal molding, and a method for manufacturing same. The acrylic resin film according to the present invention includes 10 to 70 parts by weight of an acrylic resin having high fluidity, 10 to 70 parts by weight of an acrylic resin having high hardness, and 5 to 20 parts by weight of an acrylic impact reinforcing material based on 100 parts by weight of the total weight.

8 Claims, 1 Drawing Sheet

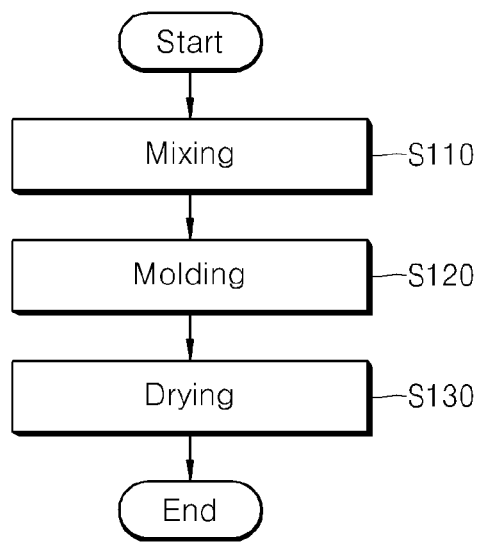

ABSTRACT

ACRYLIC RESIN FILM HAVING GOOD TRANSPARENCY AND IMPACT RESISTANCE AND METHOD FOR MANUFACTURING SAME

TECHNICAL FIELD

The present invention relates to an acrylic resin film and a method for preparing the same. More particularly, the present invention relates to an acrylic resin film which maintains gloss even after thermoforming and exhibits excellent transparency, processability and impact resistance, and a method for preparing the same.

BACKGROUND ART

An acrylic resin exhibits excellent transparency and weather resistance, and is used in a variety of industries such as in housings for electronics, outer layers of decorative films, and the like. In particular, the acrylic resin is prepared into an acrylic sheet or film through extrusion or calendering and can be laminated on metal, wood, and the like.

However, the acrylic film generally exhibits brittleness and low elongation, and thus has a problem when used as a film for lamination. Although a butadiene impact modifier or an acrylic impact modifier can be used to complement brittleness and improve elongation, the butadiene impact modifier can cause significant deterioration in transparency of the acrylic film, and the acrylic impact modifier can cause high surface roughness according to an added amount thereof.

DISCLOSURE

Technical Problem

It is one aspect of the present invention to provide an acrylic resin film which can secure high gloss even after thermoforming and excellent surface quality.

It is another aspect of the present invention to provide a method for preparing an acrylic resin film exhibiting high gloss and excellent surface quality.

Technical Solution

In accordance with one aspect of the present invention, an acrylic resin film exhibiting excellent transparency and impact resistance includes: 10 parts by weight to 70 parts by weight of a high-fluidity acrylic resin; 10 parts by weight to 70 parts by weight of a high-rigidity acrylic resin; and 5 parts by weight to 20 parts by weight of an acrylic impact modifier, based on a total of 100 parts by weight of the acrylic resin film.

In accordance with another aspect of the present invention, a method for preparing an acrylic resin film exhibiting excellent transparency and impact resistance includes: (a) preparing a resin composition by mixing 10 parts by weight to 70 parts by weight of a high-fluidity acrylic resin, 10 parts by weight to 70 parts by weight of a high-rigidity acrylic resin, and 5 parts by weight to 20 parts by weight of an acrylic impact modifier, based on a total of 100 parts by weight of the resin composition; (b) forming a resin molded article through melt extrusion of the resin composition; and (c) drying the resin molded article.

Advantageous Effects

According to the present invention, the acrylic resin film is prepared by compounding a high-fluidity acrylic resin, a high-rigidity acrylic resin and an acrylic impact modifier, thereby providing high gloss even after thermoforming while ensuring good processability.

DESCRIPTION OF DRAWINGS

FIG. 1 is a flowchart of a method for preparing an acrylic resin film according to one embodiment of the present invention.

BEST MODE

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the present invention by those skilled in the art. The scope of the present invention is defined only by the claims. Like components will be denoted by like reference numerals throughout the specification.

Hereinafter, an acrylic resin film exhibiting excellent transparency and impact resistance and a method for preparing the acrylic resin film according to embodiments of the present invention will be described in detail with reference to the accompanying drawings.

According to embodiments of the invention, an acrylic resin film may include 10 parts by weight to 70 parts by weight of a high-fluidity acrylic resin, 10 parts by weight to 70 parts by weight of a high-rigidity acrylic resin, and 5 parts by weight to 20 parts by weight of an acrylic impact modifier, based on a total of 100 parts by weight of the acrylic resin film.

The high-fluidity acrylic resin may have a weight average molecular weight of 100,000 or less. Here, the high-fluidity acrylic resin may include 70 parts by weight to 90 parts by weight of methyl methacrylate (MMA), and 30 parts by weight to 10 parts by weight of methyl acrylate) (MA).

The high-rigidity acrylic resin may have a weight average molecular weight of 150,000 or more. Here, the high-rigidity acrylic resin may include 65 parts by weight to 85 parts by weight of methyl methacrylate (MMA), 35 parts by weight to 15 parts by weight of methyl acrylate (MA), and 5 parts by weight to 10 parts by weight of styrene.

The acrylic impact modifier may include butyl acrylate and may have a core-shell stacked structure. Here, the acrylic impact modifier may have an average diameter from 200 nm to 300 nm.

According to the invention, since the acrylic impact modifier is used in the acrylic resin film, the acrylic resin film can maximize compatibility with acrylic resins, and can maintain transparency, processability and gloss. In particular, the acrylic resin film can improve elongation and surface gloss without deterioration in optical properties through adjustment of an amount of the acrylic impact modifier.

Hereinafter, a method for preparing an acrylic resin film according to embodiments of the present invention will be described in detail.

FIG. 1 is a flowchart of a method for preparing an acrylic resin film according to one embodiment of the present invention.

Referring to FIG. 1, the method for preparing an acrylic resin film includes mixing S110, molding S120, and drying S130.

Mixing

In operation S110 of mixing, a resin composition is prepared by mixing 10 parts by weight to 70 parts by weight of a high-fluidity acrylic resin, 10 parts by weight to 70 parts by weight of a high-rigidity acrylic resin, and 5 parts by weight to 20 parts by weight of an acrylic impact modifier, based on a total of 100 parts by weight of the resin composition.

The high-fluidity and high-rigidity acrylic resins serve to secure certain fluidity and rigidity, and when the components are mixed within these ranges, the acrylic resin film can maintain impact resistance and improve heat resistance. In addition, the acrylic impact modifier is added to improve processability of the acrylic resin film. If the acrylic impact modifier is present in an amount of less than 5 parts by weight, it can be difficult for the acrylic resin film to properly exhibit the above effects. Conversely, if the acrylic impact modifier is present in an amount of greater than 20 parts by weight, there is a problem of significant deterioration in surface gloss of the acrylic resin film.

Here, the high-fluidity acrylic resin may have a weight average molecular weight of 100,000 or less, more specifically from 50,000 to 100,000. The high-fluidity acrylic resin may include 70 parts by weight to 90 parts by weight of methyl methacrylate (MMA), and 30 parts by weight to 10 parts by weight of methyl acrylate (MA). When the methyl methacrylate and the methyl acrylate are copolymerized within these ranges, the acrylic resin film can maintain impact resistance and improve heat resistance while exhibiting high fluidity.

The high-rigidity acrylic resin may have a weight average molecular weight of 150,000 or more, more specifically from 150,000 to 250,000. Here, the high-rigidity acrylic resin may include 65 parts by weight to 85 parts by weight of methyl methacrylate (MMA), 35 parts by weight to 15 parts by weight of methyl acrylate (MA), and 5 parts by weight to 10 parts by weight of styrene. In copolymerization of the monomers, solid state polymerization can provide a polymer having a weight average molecular weight of 150,000 or more. Within these ranges of the methyl methacrylate, the methyl acrylate and the styrene, the acrylic resin film can maintain impact resistance and improve heat resistance while exhibiting high rigidity.

The acrylic impact modifier may include butyl acrylate as a main component and have a core-shell stacked structure. The acrylic impact modifier may have an average diameter from 200 nm to 300 nm. For example, a core may include a polymer of monomers including butyl acrylate, and a shell may be attached to the core and include a polymer of monomers including butyl acrylate.

If the acrylic impact modifier has an average diameter of less than 200 nm, there is a problem of significant deterioration in impact resistance of the acrylic resin film due to insufficient effects of the impact modifier. Conversely, if the acrylic impact modifier has an average diameter of greater than 300 nm, it can be difficult to realize whitening resistance of the acrylic resin film.

Molding

In operation S120 of molding, a resin molded article is formed through melt extrusion of the resin composition. Here, the resin molded article may be prepared by a process, such as melt-softening, T-die, calendering, and the like. Preferably, the resin molded article is prepared using a T-die process. The resin molded article has a thickness of 300 μm or less, preferably from 50 μm to 300 μm, without being limited thereto. In the case that the resin molded article is formed by the T-die process, if the resin molded article coming from a T-die is processed using a metal type mirror surface touch roll generally used for films having a thickness of 100 μm or more, the film can exhibit reduced surface roughness and low haze.

However, it is difficult to use a mirror surface touch roll for a film having a thickness of 100 μm or less, and when the thickness is adjusted by stretching the resin molded article, the film can exhibit high haze due to surface roughness. Such a problem can be solved through use of a carrier type mirror surface roll, and a film exhibiting minimized haze can also be prepared using a press roll or a steel belt type roll.

Melt extrusion may be performed at 200° C. to 300° C. If melt extrusion is performed at a temperature of less than 200° C., there can be a problem of insufficient melting. Conversely, if melt extrusion is performed at a temperature of higher than 300° C., there can be problems such as carbonization of raw materials and decomposition of a polymer.

Drying

In operation S130 of drying, the resin molded article is dried at 50° C. to 70° C. for 3 hours to 5 hours. In this operation, if the drying temperature is less than 50° C. or the drying time is less than 3 hours, there can be a problem of insufficient drying. Conversely, if the drying temperature is greater than 90° C. or the drying time is greater than 5 hours, deformation of a product may result from excessive drying temperature and time.

In this way, the acrylic resin film according to the embodiment of the invention can be prepared.

The acrylic resin film prepared through S110 to S130 is formed by compounding the high-fluidity acrylic resin, the high-rigidity acrylic resin and the acrylic impact modifier, and thus can secure high gloss even after thermoforming and exhibit good processability.

EXAMPLES

Hereinafter, the present invention will be described in more detail with reference to some examples. It should be understood that these examples are provided for illustration only and are not to be in any way construed as limiting the present invention.

Descriptions of details apparent to those skilled in the art will be omitted for clarity.

1. Preparation of Specimen

Example 1

400 g of a high-fluidity acrylic resin, which has a melt index of 10 g/10 min (230° C.) and includes 80% by weight (wt %) of methyl methacrylate (MMA) and 20 wt % of methyl acrylate (MA), 400 g of a high-rigidity acrylic resin, which has a melt index of 1 g/10 min (230° C.) and includes 75 wt % of methyl methacrylate (MMA), 19 wt % of methyl acrylate (MA) and 6 wt % of styrene, and 200 g of a butyl acrylate impact modifier having an average diameter of 250 nm were subjected to melt extrusion at 250° C. using a twin-screw extruder, followed by drying at 60° C. for 4 hours, thereby preparing a 100 μm thick acrylic resin film.

Example 2

450 g of a high-fluidity acrylic resin, which has a melt index of 10 g/10 min (230° C.) and includes 80 wt % of methyl methacrylate (MMA) and 20 wt % of methyl acrylate (MA), 450 g of a high-rigidity acrylic resin, which has a melt index of 1 g/10 min (230° C.) and includes 75 wt % of methyl methacrylate (MMA), 19 wt % of methyl acrylate (MA) and 6 wt % of styrene, and 100 g of a butyl acrylate impact modifier having an average diameter of 250 nm were subjected to melt extrusion at 250° C. using a twin-screw extruder, followed by drying at 60° C. for 4 hours, thereby preparing a 100 μm thick acrylic resin film.

Example 3

475 g of a high-fluidity acrylic resin, which has a melt index of 10 g/10 min (230° C.) and includes 80 wt % of methyl methacrylate (MMA) and 20 wt % of methyl acrylate (MA), 475 g of a high-rigidity acrylic resin, which has a melt index of 1 g/10 min (230° C.) and includes 75 wt % of methyl methacrylate (MMA), 19 wt % of methyl acrylate (MA) and 6 wt % of styrene, and 50 g of a butyl acrylate impact modifier having an average diameter of 250 nm were subjected to melt extrusion at 250° C. using a twin-screw extruder, followed by drying at 60° C. for 4 hours, thereby preparing a 100 μm thick acrylic resin film.

Example 4

400 g of a high-fluidity acrylic resin, having a melt index of 10 g/10 min (230° C.) and a weight average molecular weight of 80,000 and including 80 wt % of methyl methacrylate (MMA) and 20 wt % of methyl acrylate (MA), 400 g of a high-rigidity acrylic resin, having a melt index of 1 g/10 min (230° C.) and a weight average molecular weight of 200,000, and including 67 wt % of methyl methacrylate (MMA), 28 wt % of methyl acrylate (MA) and 5 wt % of styrene, and 150 g of a butyl acrylate impact modifier having an average diameter of 250 nm were subjected to melt extrusion at 250° C. using a twin-screw extruder, followed by drying at 60° C. for 4 hours, thereby preparing a 100 μm thick acrylic resin film.

Example 5

475 g of a high-fluidity acrylic resin, having a melt index of 10 g/10 min (230° C.) and a weight average molecular weight of 50,000, and including 50 wt % of methyl methacrylate (MMA) and 50 wt % of methyl acrylate (MA), 475 g of a high-rigidity acrylic resin, having a melt index of 1 g/10 min (230° C.) and a weight average molecular weight of 160,000, and including 72 wt % of methyl methacrylate (MMA), 20 wt % of methyl acrylate (MA) and 8 wt % of styrene, and 100 g of a butyl acrylate impact modifier having an average diameter of 250 nm were subjected to melt extrusion at 250° C. using a twin-screw extruder, followed by drying at 60° C. for 4 hours, thereby preparing a 100 μm thick acrylic resin film.

Example 6

475 g of a high-fluidity acrylic resin, having a melt index of 10 g/10 min (230° C.) and a weight average molecular weight of 60,000, and including 90 wt % of methyl methacrylate (MMA) and 10 wt % of methyl acrylate (MA), 475 g of a high-rigidity acrylic resin, having a melt index of 1 g/10 min (230° C.) and a weight average molecular weight of 170,000, and including 79 wt % of methyl methacrylate (MMA), 15 wt % of methyl acrylate (MA) and 6 wt % of styrene, and 100 g of a butyl acrylate impact modifier having an average diameter of 250 nm were subjected to melt extrusion at 250° C. using a twin-screw extruder, followed by drying at 60° C. for 4 hours, thereby preparing a 100 μm thick acrylic resin film.

Comparative Example 1

1000 g of a high-fluidity acrylic resin, having a melt index of 10 g/10 min (230° C.) and including 80 wt % of methyl methacrylate (MMA) and 20 wt % of methyl acrylate (MA), was subjected to melt extrusion at 250° C. using a twin-screw extruder, followed by drying at 60° C. for 4 hours, thereby preparing a 100 μm thick acrylic resin film.

Comparative Example 2

1000 g of a high-fluidity acrylic resin, having a melt index of 1 g/10 min (230° C.) and including 75 wt % of methyl methacrylate (MMA) and 25 wt % of methyl acrylate (MA), was subjected to melt extrusion at 250° C. using a twin-screw extruder, followed by drying at 60° C. for 4 hours, thereby preparing a 100 μm thick acrylic resin film.

Comparative Example 3

1000 g of a butyl acrylate impact modifier having an average diameter of 250 nm was subjected to melt extrusion at 250° C. using a twin-screw extruder, followed by drying at 60° C. for 4 hours, thereby preparing a 100 μm thick acrylic resin film.

Comparative Example 4

800 g of a high-fluidity acrylic resin, having a melt index of 10 g/10 min (230° C.) and including 80 wt % of methyl methacrylate (MMA) and 20 wt % of methyl acrylate (MA), and 200 g of a butyl acrylate impact modifier having an average diameter of 250 nm were subjected to melt extrusion at 250° C. using a twin-screw extruder, followed by drying at 60° C. for 4 hours, thereby preparing a 100 μm thick acrylic resin film.

Comparative Example 5

800 g of a high-fluidity acrylic resin, having a melt index of 1 g/10 min (230° C.) and including 75 wt % of methyl methacrylate (MMA) and 25 wt % of methyl acrylate (MA), and 200 g of a butyl acrylate impact modifier having an average diameter of 250 nm were subjected to melt extrusion at 250° C. using a twin-screw extruder, followed by drying at 60° C. for 4 hours, thereby preparing a 100 μm thick acrylic resin film.

Comparative Example 6

An acrylic resin film was prepared in the same manner as in Example 1 except that a butyl acrylate impact modifier having an average diameter of 100 nm was used.

Comparative Example 7

250 g of a high-fluidity acrylic resin, having a melt index of 10 g/10 min (230° C.) and including 80 wt % of methyl methacrylate (MMA) and 20 wt % of methyl acrylate (MA), 250 g of a high-rigidity acrylic resin, having a melt index of 1 g/10 min (230° C.) and including 75 wt % of methyl methacrylate (MMA), 19 wt % of methyl acrylate (MA) and 6 wt % of styrene, and 500 g of a butyl acrylate impact modifier having an average diameter of 250 nm were subjected to melt extrusion at 250° C. using a twin-screw extruder, followed by drying at 60° C. for 4 hours, thereby preparing a 100 μm thick acrylic resin film.

2. Property Evaluation

Table 1 shows measurement results of gloss before and after thermoforming of the specimens prepared in Examples 1 to 3, and Comparative Examples 1 to 2 and 7. Table 2 shows evaluation results of properties of the specimens prepared Examples 1 to 5 and Comparative Examples 1 to 6.

(1) Tensile Strength

Tensile strength was measured in accordance with ASTM 638.

(2) Gloss

Gloss was measured at an angle of 60° using a glossmeter.

(3) Gloss after Thermoforming

A film prepared using an extruder was placed in an oven at 210° C. which was a higher than a substantial heating temperature (150° C. to 200° C.) of the film upon thermoforming, followed by removing the film after 1 minutes, 3 minutes and 5 minutes, respectively, to measure gloss at an angle of 60° using a glossmeter.

(4) Elongation

Elongation was measured at room temperature using a universal testing machine (UTM), Z010 (Zwick/Roell Co., Ltd.). A specimen having a width of 10 mm was prepared to measure elongation at a tensile speed of 100 mm/min.

(5) Transmittance

Transmittance was measured in accordance with ASTM D1003.

(6) Impact resistance

Izod impact strength was measured in accordance with ASTM D785.

Measurement temperature: 0° C., Specimen: 12.7 mm (width)×64 mm (length)×3.2 mm (thickness)
◎: measurement value of 151 J/m to 170 J/m
o: measurement value of 141 J/m to 150 J/m
Δ: measurement value of 121 J/m to 140 J/m
X: measurement value of 120 J/m or less Referring to Tables 1 and 2, the specimens of Examples 1 to 5 did not show a large difference between gloss before thermoforming and gloss over time after thermoforming. In addition, it could be confirmed that the specimens of Examples 1 to 5 exhibited excellent elongation, transmittance and impact resistance while having appropriate tensile strength.

The specimen of Comparative Example 3 could not be prepared. In addition, it could be seen that, as in the specimen of Comparative Example 7, when the butyl acrylate impact modifier was added in an excess amount of 50% or more, surface gloss of the specimen was gradually deteriorated, and gloss after thermoforming was significantly deteriorated over time.

It could be seen that, although the specimens of Comparative Examples 1 and 2 did not show a change of gloss due to thermoforming, the specimens exhibited extremely vulnerable impact resistance and low elongation, and thus were unsuitable for use as a laminate film.

In addition, although the specimen of Comparative Examples 4 and 5 exhibited good elongation, transmittance and impact resistance, the specimens did not provide desired tensile strength.

Further, it could be seen that, although the specimen of Comparative Example 6, which included the impact modifier having an average diameter out of the range according to the present invention, exhibited similar tensile strength, elongation and transmittance to those of the specimen of Example 1, the specimen exhibited significantly deteriorated impact resistance.

From the experimental results, it was confirmed that, when an appropriate amount of the butyl acrylate impact modifier was added to the high-fluidity and high-rigidity acrylic resins as in the specimens according to Examples 1 to 5, the acrylic resin films had improved processability and impact resistance.

TABLE 1

|  |  | Example 1 | Example 2 | Example 3 | Comparative Example 1 | Comparative Example 2 | Comparative Example 7 |
|---|---|---|---|---|---|---|---|
| Gloss |  | 105 | 103 | 102 | 110 | 109 | 101 |
| Gloss after thermoforming | After 1 min | 104 | 103 | 103 | 110 | 110 | 90 |
|  | After 2 min | 90 | 90 | 91 | 109 | 109 | 63 |
|  | After 3 min | 90 | 89 | 89 | 108 | 107 | 56 |

TABLE 2

|  | Example 1 | Example 2 | Example 3 | Example 4 | Example 5 | Example 6 |
|---|---|---|---|---|---|---|
| Tensile strength (N/cm$^2$) | 705 | 855 | 871 | 812 | 841 | 836 |
| Elongation (%) | 12.7 | 7.3 | 5.9 | 8.7 | 7.9 | 8.4 |
| Transmittance (%) | 91 | 92 | 91 | 92 | 91 | 91 |
| Impact resistance | ◎ | ○ | Δ | ○ | ○ | Δ |

|  | Comparative Example 1 | Comparative Example 2 | Comparative Example 3 | Comparative Example 4 | Comparative Example 5 | Comparative Example 6 |
|---|---|---|---|---|---|---|
| Tensile strength (N/cm$^2$) | 900 | 1000 | Film preparation impossible | 701 | 701 | 900 |
| Elongation (%) | 3.1 | 2.7 | — | 14.1 | 10.5 | 7.0 |
| Transmittance (%) | 92 | 93 | — | 91 | 91 | 92 |
| Impact resistance | X | X | — | ○ | Δ | X |

The invention claimed is:

1. An acrylic resin film comprising:
   10 parts by weight to 70 parts by weight of a first acrylic resin, wherein the first acrylic resin comprises 70 parts by weight to 90 parts by weight of methyl methacrylate (MMA) and 10 parts by weight to 30 parts by weight of methyl acrylate (MA);
   10 parts by weight to 70 parts by weight of a second acrylic resin, wherein the second acrylic resin comprises 65 parts by weight to 85 parts by weight of methyl methacrylate (MMA), 35 parts by weight to 15 parts by weight of methyl acrylate (MA) and 5 parts by weight to 10 parts by weight of styrene; and
   5 parts by weight to 20 parts by weight of an acrylic impact modifier, based on a total of 100 parts by weight of the acrylic resin film.

2. The acrylic resin film according to claim 1, wherein the first acrylic resin has a weight average molecular weight of 100,000 or less.

3. The acrylic resin film according to claim 1, wherein the second high rigidity acrylic resin has a weight average molecular weight of 150,000 or more.

4. The acrylic resin film according to claim 1, wherein the acrylic impact modifier comprises butyl acrylate and has a core-shell structure.

5. A method for preparing an acrylic resin film, comprising:
   (a) preparing a resin composition by mixing 10 parts by weight to 70 parts by weight of a first acrylic resin wherein the first acrylic resin comprises 70 parts by weight to 90 parts by weight of methyl methacrylate (MMA) and 30 parts by weight to 10 parts by weight of methyl acrylate (MA), 10 parts by weight to 70 parts by weight of a second acrylic resin wherein the second acrylic resin comprises 65 parts by weight to 85 parts by weight of methyl methacrylate (MMA), 35 parts by weight to 15 parts by weight of methyl acrylate (MA) and 5 parts by weight to 10 parts by weight of styrene, and 5 parts by weight to 20 parts by weight of an acrylic impact modifier, based on a total of 100 parts by weight of the resin composition;
   (b) forming a resin molded article through melt extrusion of the resin composition; and
   (c) drying the resin molded article.

6. The method according to claim 5, wherein, in operation (b), the resin molded article is formed by a T-die process.

7. The method according to claim 5, wherein, in operation (b), melt extrusion is performed at 200° C. to 300° C.

8. The method according to claim 5, wherein, in operation (c), drying is performed at 50° C. to 70° C. for 3 hours to 5 hours.

* * * * *